Sept. 13, 1960    H. M. FOX    2,952,122
FUEL SYSTEM FOR DUCTED ROCKET RAMJET POWER PLANTS
Filed April 29, 1955

INVENTOR.
H. M. FOX
BY Hudson and Young
ATTORNEYS

United States Patent Office 2,952,122
Patented Sept. 13, 1960

2,952,122

FUEL SYSTEM FOR DUCTED ROCKET RAMJET POWER PLANTS

Homer M. Fox, Bartlesville, Okla., assignor to Phillips Petroleum Company, a corporation of Delaware Filed Apr. 29, 1955, Ser. No. 504,980

5 Claims. (Cl. 60—35.6)

This invention relates to a fuel system for ducted rocket ramjet power plants. In a further aspect, this invention relates to ducted rocket ramjet power plants utilizing readily available and easily handled fuel which is decomposable to form a fuel having a higher flame speed than the original fuel and comprises reacting a conventional propellant in a propellant reaction chamber arranged in communication with a fuel decomposition chamber, decomposing a hydrocarbon fuel in said fuel decomposition chamber at elevated temperatures into the fuel having the higher flame speed, discharging said decomposition products into a ramjet combustion zone to be burned in the air entering the ramjet casing, and exhausting the combustion products and heated air through an exhaust nozzle to develop thrust.

In propulsion devices employing the jet propulsion principle, one type in use is commonly known as the ramjet engine in which air is introduced into the diffuser where velocity head is converted to static pressure, and the air is then introduced into the combustion chamber. The products of combustion are accelerated from the rear end of the casing at high velocity to provide the engine with forward propulsive thrust. The engine obtains the oxygen required for combustion of the fuel from the air introduced into the engine by ram action so that no air is available until motion is initiated, making an auxiliary source of air or a launching mechanism necessary for starting the combustion. The exhaustion of the combustion products may induce sufficient air to maintain combustion at a low level without developing sufficient thrust to move the craft; however, even if air is supplied for initiation appreciable thrust is not developed until high speed of the craft is established at which time the air supplied through ram action is sufficient to permit substantial pressure to be developed. Because sufficient pressure is not reached at low speeds of the craft, the thermal efficiency of the system is very low at these low flight speeds.

In order to provide a jet propulsion device which attains high thrust over a large range of operating conditions and which has low values of specific fuel consumption at high speeds, a combination power plant comprising a ramjet propulsion device and a rocket propulsion device has been developed. In one common form of such a combination engine, called a ducted rocket ramjet engine, a rocket motor is mounted inside the ramjet casing in front of the ramjet combustion chamber and air is introduced into the combustion chamber by ejector action created with the discharge of the rocket propellant decomposition products into the exhaust system of the ramjet engine. The induction of air into the ramjet combustion chamber by the rocket motor permits the ramjet fuel to be burned and thrust to be developed when starting and at low flight speed.

The present invention provides a ducted rocket ramjet propulsion device utilizing a readily available and easily handled fuel which is decomposable at elevated temperature to constituents of higher combustion stability in air. The ducted rocket ramjet power plant of this invention develops thrust at low air speeds where ordinary ramjet operation is inefficient or impossible. The ducted rocket ramjet power plant of this invention also develops high thrust and high combustion efficiency over a wide range of operating conditions and the combustion process in the power plant of this engine has improved combustion stability in comparison to other power plants of the same type.

Figure 1:
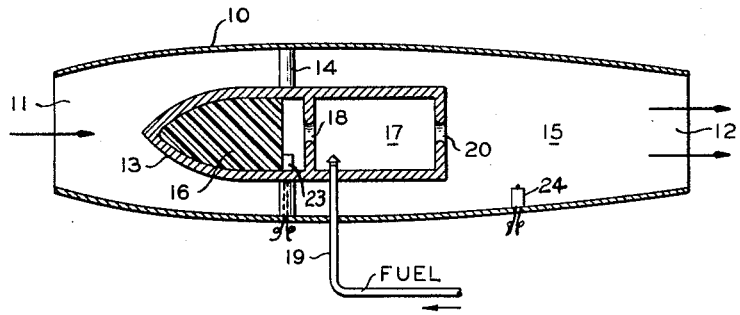
Figure 1 is a sectional view of the power plant of my invention.

Figure 1 is a diagrammatic drawing of one embodiment of this invention, employing a double base solid rocket propellant. This ducted rocket ramjet engine comprises a ramjet casing 10, having an inlet diffuser section 11 and an exhaust nozzle 12 located at either end with elongated flame holder 13 located in the center of casing 10 near the inlet end 11. Flame holder 13 is supported in casing 10 by spokes 14. The ramjet combustion zone 15 is located between the discharge end of flame holder 13 and discharge nozzle 12. The propellant reaction chamber 16 is located in the front end of flame holder 13 and is in communication with fuel decomposition chamber 17 through opening 18. The solid propellant is fitted in propellant reaction chamber 16 and the fuel is supplied to the decomposition chamber 17 by fuel line 19. The rocket propellant and fuel decomposition products are exhausted through nozzle 20 into ramjet combustion zone 15 where combustion of the combustible decomposition products takes place utilizing the air entering through inlet diffuser section 11. Suitable ignition means, such as squib 23, is provided for igniting the propellant. An igniter, such as spark plug 24, is provided to ignite fuel in chamber 15 when necessary.

Figure 2:
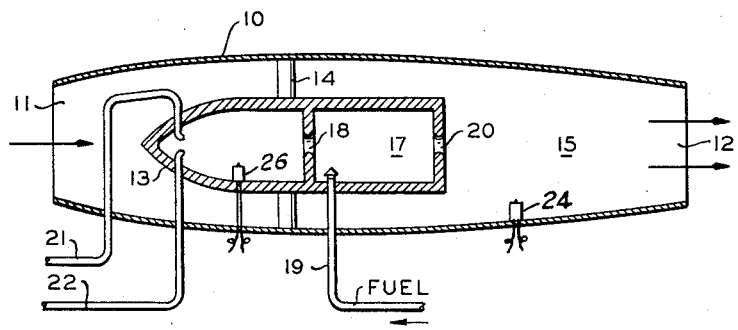
Figure 2 is a sectional view of a modification of the first embodiment.

Figure 2 is a drawing of a modification of that shown in Figure 1 wherein provision is made for the combustion of liquid propellant in the propellant reaction chamber of flame holder 13. The structure is the same as that shown in Figure 1 except that conduits 21 and 22 are provided for the introduction of the components of the propellant. An igniter, such as spark plug 26, is provided to ignite the liquid propellant when necessary.

In the present invention, a primary fuel, which is decomposable at elevated temperatures to constituents of higher combustion stability, is supplied to the power plant as the primary fuel and a conventional rocket propellant is utilized as a secondary fuel to supply the energy required for decomposing the primary fuel and to develop thrust during starting or at low speeds and to augment the thrust developed by the ramjet section of the engine, particularly at high altitudes where the air is less dense. Not all of the fuel need be decomposed in order to obtain the advantages of my invention. Some of the primary fuels employed in the power plant of this invention are hydrocarbons having 6 to 14 carbon atoms. These include paraffins and cycloparaffins such as hexanes, heptanes, decanes, tetradecanes, methylcyclopentane, cyclohexane, methylcyclohexane, decalin, octylcyclohexane, di-n-butylcyclohexane, and the like; the corresponding olefins; and aromatics such as benzene, toluene and the like. Mixtures of these materials are suitable. Regular JP fuels are commonly used. Other hydrocarbons can also be used provided they are decomposable into constituents of higher combustion stability such as hydrogen, methane, acetylene and other low molecular weight saturated and unsaturated hydrocarbons. Hydrogen, acetylene and some of the other of these decomposition products have high flame speeds and high combustion stability and the utilization of the fuels of this type results in improved operation of the power plant. Broadly stated the fuels are those in which the continuous application of heat from an outside source (specifically, the rocket propellant) is required to decompose the fuel. The hydrocarbon fuels disclosed in this invention have not been employed in ducted rocket ramjet power plants because mostly they have positive or only low negative heats of formation and are incapable of auto-decomposition to combustible constituents. The decomposition of the propellant supplies the energy required to effect the decomposition of the hydrocarbon fuel and, therefore, the amount of propellant supplied to the power plant is a minor proportion of the total fuel.

As set forth above, the ducted rocket ramjet power plant of this invention comprises an elongated cylindrical flame holder 13 centrally located in the ramjet casing 10 downstream from the inlet diffuser 11 and upstream of the ramjet combustion chamber 15. This flame holder 13 contains two chambers adapted to communicate at one end with each other and arranged so that the second chamber has an opening discharging rearwardly into the ramjet combustion chamber. The first or forward chamber 16 is the propellant reaction chamber in which the propellant decomposes or burns and the hot gases formed are discharged into the second chamber 17, the hydrocarbon decomposition chamber, where the hydrocarbon fuel is decomposed to form constituents of higher combustion stability in air. The combustible constituents are discharged rearwardly from the second chamber 17 into the ramjet combustion chamber 15 where these constituents of higher combustion stability are burned in the air induced through the diffuser 11 of the ramjet casing. Thrust is developed primarily by the discharging of the hot combustion products and heated air through the nozzle 12 of the ramjet casing; however, thrust is also developed by the discharge of the propellant decomposition products and the hydrocarbon decomposition products into the ramjet combustion chamber 15 and out the exhaust nozzle 12 of the engine. The primary purpose of the decomposition of the propellant in the propellant reaction chamber 16 is to supply the energy required for the decomposition of the fuel in the hydrocarbon decomposition chamber 17 and not to develop thrust for the engine; however, the thrust developed by the discharge of the hot gases into the ramjet combustion chamber 15 and out the exhaust nozzle 12 is utilized to accelerate the engine from rest and to augment the thrust of the ramjet section of the engine whenever a tactical problem demands additional thrust and whenever the air at higher altitudes is too thin to support adequately the combustion of the required amount of fuel.

The propellant decomposed in the propellant reaction chamber can be either the mono-propellant or the bi-propellant type and can be utilized in either solid or liquid form. The propellant should have a moderately high or high reaction temperature and preferably should have a reaction temperature above about 1500° F. Since the advantages of increased combustion stability and efficiency which are produced by operating according to the method of this invention are realized only during the time the ramjet fuel is being decomposed, the propellant utilized in this invention must ordinarily have a long burning time. Usually propellants having a slow burning rate are used; however, propellants having fast burning rates can be used in applications in which long durations of thrust are not required. A very suitable solid propellant comprises ammonium nitrate as the oxidant and a solid polymeric organic compound, such as a copolymer of butadiene and methylvinylpyridine or butadiene and styrene, as the binder and fuel therefor. This type propellant can be made with a relatively slow burning rate and is the preferred solid bi-propellant for use in this invention. The composition and method of preparation of a solid propellant of this type is described in application Serial No. 284,447 of Reynolds et al. filed April 25, 1952. Another solid bi-propellant comprises ammonium perchlorate and polysulfide rubber. Some of the liquid bi-propellants suitable for use in this invention include the combination of oxidant and fuel such as liquid oxygen and alcohol, red fuming nitric acid and aniline plus furfuryl alcohol, red fuming nitric acid and xylidine plus gasoline, white fuming nitric acid and kerosene (JP-3 or JP-4 jet fuel), or the like. A preferred liquid bi-propellant for many applications is one in which the hydrocarbon component of the bi-propellant is the same as the hydrocarbon supplied to the decomposition chamber as the ramjet fuel so that fewer fuel tanks are required and the fuel system of the power plant is simplified. If a monopropellant is employed, the monopropellant may be one which also has decomposition products that are combustible and methylacetylene and ethylene oxide are examples of such propellants.

The decomposition of the propellant in the propellant reaction chamber does not have to take place continuously throughout the flight of the craft but may be regulated to occur intermittently or whenever additional thrust is required. In this manner of operation, the flame holder functions as a fuel injection device from which the ramjet fuel is injected into the combustion chamber and very little decomposition of the fuel is accomplished although vaporization of the fuel does take place. The regulation of the rate of propellant decomposition can be obtained very easily in liquid propellant systems by control of the flow of the propellant components with flow valves. In solid propellant type systems, the regulation of the rate of propellant decomposition is secured by constructing the propellant in the form of a plurality of segments of solid propellant separated by inert fillers and igniting these segments individually in a number and at a rate to obtain the desired rate of propellant decomposition. Either manual means or automatic means based on the state of the ramjet combustion process can be used to regulate the rate of the decomposition of the propellant.

Furthermore, even when the hydrocarbon fuel is being decomposed in the decomposition chamber, it is not necessary that it be completely decomposed to form the components having the flame speeds higher than that of the original fuel. Good combustion stability can frequently be obtained by decomposing only a portion of the hydrocarbon fuel.

It will be obvious to one skilled in the art that the exact amount of propellant burned to crack a specific fuel to provide satisfactory burning conditions in the combustion chamber depends upon many variables. However, when a specific propellant is considered, it is possible to determine the amount of heat available for decomposing a specific hydrocarbon fuel. For instance, when a solid bi-propellant comprising 85 weight percent ammonium nitrate and 15 weight percent of an 85/15 butadiene/methylvinylpyridine copolymer is burned at 68 atmospheres pressure, the heat generated is 531 B.t.u./lb. This heat is sufficient to crack 0.233 pound of normal hexane at a temperature of 2022° R. to produce a cracked product according to the following equation $$C_6H_{14} \rightarrow 0.474C_5H_{10} + 0.244C_6H_6 + 0.124C_3H_6 + 0.127C_2H_2 + 0.978C_2H_4 + 2.000H_2 + 0.406CH_4$$

When a liquid propellant comprising a mixture of oxygen and normal hexane, in which the oxygen is present in an amount of 10 mol percent in excess of stoichiometric, is burned at 10 atmospheres pressure, there are obtained 1705 B.t.u./lb. This heat is sufficient to crack 0.748 pound of normal hexane in accordance with the equation set forth above.

It is well known that the fuel comprising these products burns with a greater combustion stability than would the normal hexane. For a specific case the amount of heat required to crack the fuel to the desired extent can be determined and, with this figure, the amount of propellant needed to supply this heat can be determined.

As many possible embodiments may be made of this invention without departing from the scope thereof, it is to be understood that all matter herein set forth is to be interpreted as illustrative and not as unduly limiting the invention.

I claim:

1. A ducted rocket ramjet power plant comprising a ramjet motor casing, said ramjet motor casing comprising an inlet end, a discharge end, and a combustion zone; and a flame holder positioned within said motor casing upstream of said combustion zone, said flame holder comprising means for cracking fuel supplied to said combustion zone, said means including a source of hot combustion gases, a cracking chamber, a first conduit extending from said source of hot combustion gases, a second conduit for supplying fuel to be cracked to said cracking chamber, said first and second conduits being the only sources of supply to said cracking chamber, and a third conduit extending from said cracking chamber to said combustion zone.

2. A ducted rocket ramjet power plant comprising a ramjet motor casing, said ramjet motor casing comprising an inlet end, a discharge end, and a combustion zone; a flame holder positioned within said motor casing zone upstream of said combustion zone, said flame holder comprising a propellant reaction chamber in the forward portion thereof and a fuel decomposition chamber in communication with said propellant reaction chamber in the rearward portion thereof; at least one exhaust nozzle in the downstream end portion of said fuel decomposition chamber; and a fuel inlet conduit communicating with said fuel decomposition chamber, said communication between said propellant reaction chamber and fuel decomposition chamber and said fuel inlet being the only inlets to said decomposition chamber.

3. A ducted rocket ramjet power plant comprising a ramjet motor casing, said ramjet motor casing comprising an inlet end, a discharge end, and a combustion zone; a flame holder positioned within said motor casing zone upstream of said combustion zone, said flame holder comprising a propellant reaction chamber in the forward portion thereof and a hydrocarbon decomposition chamber in communication with said propellant reaction chamber in the rearward portion thereof; at least one exhaust nozzle in the downstream end portion of said hydrocarbon decomposition chamber and a hydrocarbon inlet conduit communicating with said hydrocarbon decomposition chamber.

4. The power plant of claim 3 wherein a solid rocket propellant is employed in said propellant reaction chamber.

5. The power plant of claim 3 wherein said propellant reaction chamber is provided with means for supplying liquid rocket propellant thereto.

References Cited in the file of this patent

UNITED STATES PATENTS

| | | |
|---|---|---|
| 1,196,635 | Angwin | Aug. 29, 1916 |
| 1,273,466 | Doble | July 23, 1918 |
| 1,828,784 | Perrin | Oct. 27, 1931 |
| 2,176,453 | Clark | Oct. 17, 1939 |
| 2,207,552 | Putt | July 9, 1940 |
| 2,385,833 | Nahigyan | Oct. 2, 1945 |
| 2,419,866 | Wilson | Apr. 29, 1947 |
| 2,540,594 | Price | Feb. 6, 1951 |

FOREIGN PATENTS

| | | |
|---|---|---|
| 628,366 | Great Britain | Aug. 26, 1949 |